(12) United States Patent
Bayer et al.

(10) Patent No.: US 11,031,645 B2
(45) Date of Patent: Jun. 8, 2021

(54) DEVICE FOR STORING ELECTRICAL ENERGY, METHOD FOR ASSEMBLING AND STARTING UP SAID DEVICE, AND METHOD FOR OPERATING SAID DEVICE

(71) Applicant: BASF SE, Ludwigshafen am Rhein (DE)

(72) Inventors: Domnik Bayer, Ludwigshafen (DE); Jesus Enrique Zerpa Unda, Ludwigshafen (DE); Wolfgang Jabczynski, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 324 days.

(21) Appl. No.: 16/061,882

(22) PCT Filed: Dec. 13, 2016

(86) PCT No.: PCT/EP2016/080747
§ 371 (c)(1),
(2) Date: Jun. 13, 2018

(87) PCT Pub. No.: WO2017/102697
PCT Pub. Date: Jun. 22, 2017

(65) Prior Publication Data
US 2019/0006638 A1    Jan. 3, 2019

(30) Foreign Application Priority Data
Dec. 14, 2015    (EP) .................................. 15199894

(51) Int. Cl.
*H01M 10/39* (2006.01)
*H01M 50/138* (2021.01)
(Continued)

(52) U.S. Cl.
CPC ....... *H01M 50/138* (2021.01); *H01M 4/0447* (2013.01); *H01M 4/0476* (2013.01);
(Continued)

(58) Field of Classification Search
None
See application file for complete search history.

(56) References Cited

U.S. PATENT DOCUMENTS 3,993,503 A * 11/1976 Ludwig ............. H01M 10/3909
429/103
4,038,465 A    7/1977 Ludwig et al.
(Continued)

FOREIGN PATENT DOCUMENTS

CN    1106575 A    8/1995
CN    101752614 A    6/2010
(Continued)

OTHER PUBLICATIONS

English Translation of International Search Report for International Application No. PCT/EP2016/080747, dated Mar. 13, 2017, 3 pages.

*Primary Examiner* — Lucas J. O'Donnell
(74) *Attorney, Agent, or Firm* — Armstrong Teasdale LLP (57) ABSTRACT

A device for storing electrical energy is disclosed. The device includes an electrochemical cell having a cathode chamber for holding a liquid cathode material and an anode chamber for holding a liquid anode material. The cathode and anode chambers are separated by a solid electrolyte, wherein the solid electrolyte is surrounded by a planar construction having openings, through which the cathode material can flow. The planar construction is made of an electrically conductive material. The cathode chamber includes at least one segment, wherein each segment has a jacket composed of an electrically conductive material and the jacket is fastened to the planar construction having (Continued)

openings in a fluid-tight and electrically conductive manner and wherein each segment is filled with a porous felt or a porous material different from porous felt. A method for assembling and starting up the device and a method for operating the device is also disclosed.

15 Claims, 6 Drawing Sheets

(51) Int. Cl.
  *H01M 4/04*    (2006.01)
  *H01M 4/66*    (2006.01)
  *H01M 4/76*    (2006.01)
(52) U.S. Cl.
  CPC .......... *H01M 4/664* (2013.01); *H01M 4/668* (2013.01); *H01M 4/762* (2013.01); *H01M 10/3945* (2013.01); *H01M 10/3954* (2013.01)

(56) References Cited

U.S. PATENT DOCUMENTS

| | | | |
|---|---|---|---|
| 4,041,216 A | 8/1977 | Desplanches et al. | |
| 4,118,545 A | 10/1978 | Jones et al. | |
| 5,472,806 A | 12/1995 | Meintjes | |
| 8,597,813 B2 | 12/2013 | Murasato et al. | |
| 2014/0234734 A1 | 8/2014 | Tsutsumi et al. | |
| 2015/0140367 A1 | 5/2015 | Yagi et al. | |
| 2016/0351970 A1 | 12/2016 | Durr et al. | |

FOREIGN PATENT DOCUMENTS

| | | |
|---|---|---|
| CN | 104659439 A | 5/2015 |
| DE | 2610222 A1 | 10/1976 |
| DE | 2617930 A1 | 11/1976 |
| DE | 2635900 A1 | 5/1977 |
| DE | 2707045 A1 | 8/1977 |
| EP | 0553400 A1 | 8/1993 |
| JP | H02126571 A | 5/1990 |
| JP | H0451472 A | 2/1992 |
| JP | H05121092 A | 5/1993 |
| JP | H10270073 A | 10/1998 |
| JP | 2001243993 A | 9/2001 |
| JP | 2003234132 A | 8/2003 |
| KR | 20110054717 A | 5/2011 |
| TW | 201306373 A | 2/2013 |
| WO | 2011161072 A1 | 12/2011 |
| WO | 2013186204 A1 | 12/2013 |
| WO | 2013186213 A1 | 12/2013 |
| WO | 2015117870 A1 | 8/2015 |
| WO | 2017093386 A1 | 6/2017 |

* cited by examiner

DEVICE FOR STORING ELECTRICAL ENERGY, METHOD FOR ASSEMBLING AND STARTING UP SAID DEVICE, AND METHOD FOR OPERATING SAID DEVICE

CROSS-REFERENCE TO RELATED APPLICATIONS

This application is a U.S. National Phase Application of PCT/EP2016/080747, filed Dec. 13, 2016, which claims the benefit of priority to EP Application No. 15199894.5, filed Dec. 14, 2015, the contents of which are hereby expressly incorporated by reference in their entirety.

The invention relates to an apparatus for storing electric energy, which comprises an electrochemical cell having a cathode space for accommodating a liquid cathode material and an anode space for accommodating a liquid anode material, where the cathode space and the anode space are separated by a solid electrolyte. The invention further relates to a method for the assembly and start-up of a corresponding apparatus for storing electric energy and to a method for operation of the apparatus.

Electrochemical cells which are used for storing electric energy are generally referred to as battery or accumulator. Other electrochemical devices are, for example, electrolysis cells. These can, for example, be used for preparing alkali metals from suitable salts comprising alkali metals.

The storage of large quantities of electric energy requires appropriately high-performance re-chargeable batteries. One approach here is to use batteries based on molten sodium and sulfur. Such batteries which operate on the basis of a molten alkali metal as anode and a cathodic reaction participant, generally sulfur, are known from, for example, DE-A 26 35 900 or DE-A 26 10 222. Here, the molten alkali metal and the cathodic reaction participant are separated by a solid electrolyte which is permeable to cations. A reaction of the alkali metal with the cathodic reaction participant occurs at the cathode. This is, for example when using sodium as alkali metal and sulfur as cathodic reaction participant, the reaction of sodium and sulfur to form sodium polysulfide. To charge the battery, the sodium polysulfide is dissociated again into sodium and sulfur at the electrode by introduction of electric energy.

To increase the storage capacity of batteries based on a molten alkali metal and a cathodic reaction participant, batteries in which the amount of reactants used is increased by means of additional stock containers are used. For discharging, the liquid sodium is supplied to the solid electrolyte. The liquid sodium simultaneously serves as anode and forms cations which are transported through the cation-conducting solid electrolyte to the cathode. At the cathode, the sulfur flowing onto the cathode is reduced to polysulfide, i.e. reacted with the sodium ions to form sodium polysulfide. The corresponding sodium polysulfide can be collected in a further container. As an alternative, it is also possible to collect the sodium polysulfide together with the sulfur in the container around the cathode space. Owing to the density difference, the sulfur rises and the sodium polysulfide settles at the bottom. This density difference can also be utilized in order to bring about a flow along the cathode. A battery design of this type is described, for example, in WO 2011/161072. A further design of an electrochemical cell which can be operated with sodium and sulfur is described in WO 2013/186204. Here, the electrode is enclosed with a jacket in which openings are formed through which cathode material gets to the electrode, flows along the cathode and leaves through openings following in direction of flow.

In batteries which operate using a redox system based on sodium and sulfur, electric energy can be obtained with a high efficiency of about 90% in the reaction of sodium and sulfur to form sodium polysulfide. To charge the battery, the process is reversed by introduction of electric current and the sodium polysulfide is dissociated into sulfur and sodium. Since all electrochemical reactants are present in molten form and the optimal conductivity range of the ion-conducting ceramic membrane is reached only at relatively high temperatures, the operating temperature of such a battery is usually about 300° C.

Since the solid electrolyte used in the electrochemical cell is usually an ion-conducting ceramic, fracture of the ceramic cannot be ruled out. Such a fracture leads to undesirable contact of anode material, generally sodium, and cathode material, generally sulfur, and can lead to an uncontrolled reaction. In order to limit the consequences of such a reaction, the proportion of sodium available for the reaction can, as is known, be kept small. This is achieved, for example, by the use of a displacement body which fills the space for anode material, so that only a small gap in which the anode material is present remains. Such a displacement body is known, for example, from WO2013/186213 or from JP-A 10270073.

Since electrochemical cells based on an alkali metal as anode material and sulfur as cathode material are operated at a temperature at which both the alkali metal and sulfur are liquid, the cells are usually operated in an insulating container. Heating elements can, as described in JP-A 2003-234132, be provided in the insulating container in order to prevent the temperature of the cells dropping below a minimum temperature required for operation.

Housing the insulating container and equipping the housing with lamellae is known from U.S. Pat. No. 8,597,813. The heat removal at the outside of the insulating container can be regulated by opening or closing the lamellae. According to JP-A 05121092, the insulating container has a double wall and a vacuum is applied between the walls of the double wall. The heat removal can be adjusted by adjusting the subatmospheric pressure.

To prevent the temperature rising during operation as a result of the heat liberated, it is known from KR-A 2011-054717 that a phase change material which undergoes a phase change at operating temperature can be introduced between the electrochemical cells. A temperature increase in the insulated region can be delayed in this way. As an alternative to the use of the phase change material, JP-A 04051472 discloses blowing exterior air through the insulating container in which the electrochemical cells are accommodated in order to effect cooling and JP-A 2001-243993 discloses positioning heat tubes between the electrochemical cells with the top thereof being located outside the insulating container.

To conduct electric current all known electrochemical cells which are operated on the basis of alkali metal and sulfur have the sulfur-filled space filled with an electrically conductive felt, usually a graphite felt. The graphite felt firstly serves to prevent phase separation of alkali metal polysulfide and sulfur and secondly serves as electrode. This means that the entire space which in the fully charged state of the battery is filled with sulfur acts as electrode. To obtain a high capacity of the electrochemical cell, it is necessary to increase the amounts of sulfur and alkali metal. The alkali metal is, for safety reasons, preferably stored outside the electrochemical cell, while the sulfur is stored in an enlarged space which surrounds the solid electrolyte. The larger the space comprising the sulfur, the more graphite felt is required for operation of the electrochemical cell.

It was an object of the present invention to provide an apparatus for storing electric energy, which can be operated using a smaller amount of graphite felt or even completely without graphite felt and in which the total space filled with cathode material does not necessarily act as electrode.

This object is achieved by an apparatus for storing electric energy, which comprises an electrochemical cell having a cathode space for accommodating a liquid cathode material and an anode space for accommodating a liquid anode material, where the cathode space and the anode space are separated by a solid electrolyte, wherein the solid electrolyte is enclosed by a sheet-like structure having openings through which the cathode material can flow, the sheet-like structure is made of an electrically conductive material and the cathode space comprises at least one segment, where each segment has an outer wall composed of an electrically conductive material and the outer wall is fastened in a fluid-tight and electrically conductive manner to the sheet-like structure having openings.

As a result of the division of the cathode space into individual segments which each have an outer wall composed of an electrically conductive material, with the outer wall being fastened in a fluid-tight and electrically conductive manner to the sheet-like structure having openings, the outer wall of the segment can also act as electrode. This has the advantage that it is not necessary to accommodate a felt composed of electrically conductive material in the cathode space. This allows materials other than the graphite known from the prior art to be utilized for the felt. A further advantage of the segments is that a simple alteration of the geometry, for example a larger number of segments with a greater total diameter of the electrochemical cell, makes it possible to achieve a larger storage volume for the cathode material and thus also a greater capacity of the electrochemical cell.

To be able to operate the electrochemical cell, it is necessary for the anode space and the cathode space to be separated by an ion-conducting solid electrolyte. Suitable solid electrolytes are dependent on the cathode material and anode material used. In general, a ceramic is used as solid electrolyte. An alkali metal, in particular sodium, is preferred as anode material and sulfur is preferred as cathode material. β-Aluminum oxide or β"-aluminum oxide is particularly useful as material for the solid electrolyte in such an electrochemical cell. This aluminum oxide is preferably stabilized, for example with magnesium oxide, lithium oxide or zirconium oxide.

As an alternative to β-aluminum oxide or β"-aluminum oxide, other ceramic materials can also be used as solid electrolyte. For example, the ceramic designated as NASCION®, the composition of which is indicated in EP-A 0 553 400, can be used. As an alternative to ceramics, it is also possible to use glasses or zeolites and feldspars which conduct sodium ions. However, particular preference is given to sodium β"-aluminum oxide, sodium β-aluminum oxide, sodium β/β"-aluminum oxide. The ceramic is particularly preferably a β/β"-aluminum oxide having a ratio of β-aluminum oxide to oxide in the range from 5:95 to 0.5:99.5, in particular in the range from 3:97 to 1:99 and very particularly preferably in the range from 2:98 to 1:99. The density of the ceramic of the solid electrolyte is preferably from 95 to 99% of the theoretical density, in particular from 97 to 99% of the theoretical density and very particularly preferably from 98 to 99% of the theoretical density, where the theoretical density is given by the density of the ion-conducting ceramic, in particular the β-aluminum oxide and/or β"-aluminum oxide, in the ideal crystal plus the density of the additives calculated over the proportion by volume.

The solid electrolyte is preferably configured as a thin-wall tube which is closed at the bottom end and open at the top. In this case, the tube forming the solid electrolyte more preferably has a diameter of from 20 to 80 mm and a length in the range from 0.5 m to 2 m. The wall thickness is preferably in the range from 0.5 mm to 3 mm, in particular in the range from 1.5 mm to 2 mm. Here, the interior of the solid electrolyte preferably forms the anode space.

The production of the solid electrolyte can, for example, be carried out by isostatic pressing using the dry bag method or wet bag method. Furthermore, it is also possible to produce the solid electrolyte by ceramic extrusion or electrophoretic deposition. If the solid electrolyte is shaped by near net shape pressing of ceramic granules in a wet bag press or dry bag press, no green machining but only a hard machining step after sintering in the upper region of the open end of the solid electrolyte is necessary. In this region, the actual solid electrolyte is joined to a ceramic ring which does not conduct ions, preferably an α-aluminum oxide ring (alpha ring), by means of a glass seal.

In a preferred embodiment, the solid electrolyte is configured with a circular cross section in the form of a tube closed at the bottom. This has a length in the range from 0.5 to 2 m, preferably from 0.5 to 1.5 m and in particular from 0.5 to 1 m, an external diameter in the range from 50 to 100 mm, in particular in the range from 55 to 70 mm, and a wall thickness in the range from 1 to 3 mm, preferably in the range from 1.5 to 2 mm.

The solid electrolyte is, in one embodiment, enclosed by a porous electrode which is made of a material which is inert in respect of the substances used in the electrochemical reaction. All chemically inert and electrically conductive materials which can be wetted by the cathode material, for example carbon, in particular in the form of graphite, are suitable as material for the electrode.

For the materials participating in the electrochemical reaction to be able to flow through the electrode, the latter is, according to the invention, porous. This is, for example, achieved by the material of the porous electrodes being present in the form of a felt or nonwoven.

To improve mass transfer in the porous electrode, it is possible to supplement the chemically inert and electrically conductive material which can be wetted by the cathode material by a second material which is readily wettable by the reaction product of cathode material and anode material and does not necessarily have to be electrically conductive. Suitable materials which are readily wettable by the reaction product of cathode material and anode material are, in particular, oxide ceramics or glasses such as aluminum oxide ($Al_2O_3$), silicon dioxide, for example glass fibers, mixed oxides of aluminum with silicon, silicates and aluminosilicates and also zirconium oxide and mixtures of these materials. When a material which is readily wettable by the reaction product of anode material and cathode material is additionally comprised, the proportion of the material which is readily wettable by the reaction product of cathode material and anode material in the electrode is preferably less than 50% by volume, particularly preferably less than 40% by volume, and at least 5% by volume.

An improvement in mass transfer in the electrode can be achieved by the porous electrode being given a preferential direction by needling. The preferential direction preferably runs perpendicular to the solid electrolyte. Furthermore, an improvement in the mass transfer can be achieved by channel-like structures in the electrode, preferably perpendicular to the solid electrolyte.

To prevent an uncontrolled reaction from occurring in the case of fracture of the solid electrolyte, a chemical barrier layer is preferably accommodated between the electrode and the solid electrolyte. The chemical barrier layer is preferably permanently impregnated by the reaction product of cathode material and anode material. This prevents the anode material and the cathode material from coming into contact with one another in the event of a fracture of the solid electrolyte. To prevent cathode material from penetrating into the chemical barrier layer, the latter is preferably made of a material which has good wetting properties for the reaction product and poor wetting properties for the cathode material. Furthermore, the morphology of the chemical barrier layer is selected so that it is largely impermeable to the cathode material or the anode material. For this purpose, the chemical barrier layer has, for example, the morphology of impermeable paper.

In the case of use of alkali metal and sulfur as anode material and cathode material and accordingly alkali metal polysulfide as reaction product of anode material and cathode material, suitable materials for the chemical barrier layer are conventional materials which do not conduct electrons. Suitable materials which do not conduct electrons are, for example, oxide ceramics or glasses. Suitable oxide ceramics and glasses are, in particular, aluminum oxide ($Al_2O_3$), silicon dioxide, for example glass fibers, mixed oxides of aluminum with silicon, silicates and aluminosilicates and also zirconium oxide and mixtures of these materials. These materials have virtually no electrical conductivity under normal conditions, for example 25° C. and 1 bar.

The starting material for the chemical barrier layer is usually porous with an open porosity in the range from 50 to 99.99%, preferably from 80 to 99%, particularly preferably from 90 to 95%, where the open porosity is given by 1−(bulk density of the test specimen/density of the material forming the test specimen)×100, and with an average pore diameter of usually from 1 to 10 µm, measured by means of optical microscopy.

The base material of the chemical barrier layer is usually a sheet-like structure, for example a woven fabric, a felt or a mat, composed of fibers selected from among those described above, preferably fibers of aluminum oxide, for example commercially available under the name Fiberfrax® from Unifrax, and/or silicon dioxide, for example glass fibers.

The thickness of the chemical barrier layer is usually in the range from 0.25 to 5 mm, preferably in the range from 0.25 to 1 mm and in particular in the range from 0.25 to 0.75 mm, and the weight per unit area is preferably in the range from 20 to 300 $g/m^2$, more preferably in the range from 40 to 200 $g/m^2$ and in particular in the range from 50 to 100 $g/m^2$.

In order to be able to accommodate the electrode when a separate porous electrode is used, the cathode space is divided by the sheet-like structure having openings into an inner region and an outer region and the porous electrode and, if present, the chemical barrier layer composed of a material which does not conduct electrons are accommodated in the inner region between the sheet-like structure having openings and the solid electrolyte. The outer region comprises the segments.

To ensure the functionality of the electrochemical cell, the electrode has to have electric contact with the sheet-like structure having openings on the one side and ion-conducting contact with the solid electrolyte on the other side. In addition, it is necessary for the electrode to be impregnated with cathode material or with the reaction product of cathode material and anode material.

On the side opposite the solid electrolyte, the electrode adjoins the sheet-like structure having openings, with the sheet-like structure being made of an electrically conductive material.

In an alternative embodiment, the sheet-like structure having openings is configured in such a way that it is in direct contact with the solid electrolyte and is utilized as electrode. To obtain a very large contact area of the sheet-like structure with the solid electrolyte, it is preferably shapeable and configured, for example, as mesh structure.

The openings in the sheet-like structure are necessary for, during discharging, the cathode material to be able to be transported to the solid electrolyte and the reaction product of cathode material and anode material to be transported away from the solid electrolyte into the cathode space, or on charging for the reaction product of cathode material and anode material being able to be transported to the solid electrolyte and the cathode material to be transported away from the solid electrolyte. The shape of the openings can be chosen freely. The openings preferably have the shape of circles, squares, ovals or polygons, in particular in the form of circles or ovals. The free hole area of the sheet-like structure having openings is preferably from 20 to 90%, in particular from 40 to 70% and very particularly preferably from 50 to 60%.

The sheet-like structure having openings is, in a first embodiment, a metal sheet in which the openings are configured as holes having any shape. As an alternative, however, a mesh structure, for example, can also be used as sheet-like structure having openings. Regardless of the type of sheet-like structure having openings, this can be made up either in one part or a plurality of parts of a plurality of segments or of a plurality of layers which are joined to form a one-piece sheet-like structure.

The openings can be distributed uniformly over the sheet-like structure or the sheet-like structure has perforated and unperforated regions. In this case, particular preference is given to the unperforated regions to be in the positions where the outer wall of the respective segments is fastened to the sheet-like structure having openings.

The thickness of the sheet-like structure having openings is preferably in the range from 1 to 3 mm.

Suitable materials for the sheet-like structure having openings are steels, in particular stainless steel. Suitable stainless steels are, for example, those having the material numbers 1.4404 or 1.4571.

According to the invention, the cathode space comprises at least one segment, where each segment is enclosed by an outer wall which is electrically connected to the sheet-like structure having openings. The attachment of the outer wall is also fluid-tight so that no cathode material can exit to the outside from the segment. In the downward direction, the cathode space is closed by a bottom. The bottom can be configured as a component which closes off all cathode spaces at the lower end. Furthermore, the region within the sheet-like structure having openings in which the solid electrolyte is present can in this case also be closed off at the lower end by the bottom. This ensures that no cathode material and no reaction product of cathode material and anode material can exit from the electrochemical cell. Apart from the embodiment having only one bottom, it is also possible, as an alternative, for each segment to be closed at the lower end by a separate bottom. In this case, a further bottom element by means of which the region within the sheet-like structure having openings in which the solid electrolyte is present can be closed off at the lower end is required.

The solid electrolyte and the sheet-like structure having openings preferably each have a circular cross section. As an alternative, however, the solid electrolyte and the sheet-like structure having openings can also have any other cross-sectional shape, in particular a cross-sectional shape without corners, for example an oval or elliptical cross-sectional shape. Here, preference is given in particular, to cross-sectional shapes in the case of which the solid electrolyte encloses a space which is utilized as anode space. Accordingly, the sheet-like structure having openings also completely encloses the solid electrolyte, so that a circumferential gap between solid electrolyte and sheet-like structure having openings is formed. The then likewise annular electrode and the chemical barrier layer are accommodated in this gap.

The segments of the cathode space can be configured so that there is in each case an intermediate wall which is fastened to the sheet-like structure having openings and divides the two segments. As an alternative, it is also possible for an outer wall to be provided for each segment, and this is then configured so that the outer wall is joined on two sides to the sheet-like structure having openings so that each segment has its own outer wall which is not joined to an outer wall of an adjacent segment. Such an outer wall is, for example, U-shaped, V-shaped or configured in the form of segment of a circle, with the ends of the U, the V or the segment of a circle being joined to the sheet-like structure having openings. In this case, the sheet-like structure having openings is configured so that no openings are present in the region between two segments or, as an alternative, the openings are closed, for example by welding with additional material. In this way, fluid-tight closure of the cathode space comprising at least one segment is achieved. In order to connect the outer wall in a fluid-tight manner to the sheet-like structure having openings, particular preference is given to welding the outer wall to the sheet-like structure having openings. As material for the outer wall, preference is given to utilizing the same material as for the sheet-like structure having openings, preferably a steel, in particular stainless steel and very particularly preferably a stainless steel having the material number 1.4404 or 1.4571.

The material for the outer wall preferably has a thickness in the range from 1 to 3 mm. To obtain a fluid-tight connection when a stainless steel is used, a welding process using an additive is preferably utilized to connect the outer wall to the sheet-like structure having openings. A suitable welding process is, for example, MIG welding. Welding is preferably carried out from the outside, and care has to be taken, depending on the position of the welding seam, that the interior contour of the sheet-like structure having openings is not changed by the welding. A sufficiently large cross-sectional area to conduct away the electric current without large losses from the electrode enclosing the solid electrolyte despite the relatively low electrical conductivity of stainless steel compared to copper or aluminum is obtained by selection of the material and the, in the case of a welded connection, electrically conductive connection of the outer wall to the sheet-like structure having openings.

Since both the sheet-like structure having openings and also the outer wall of the segments of the cathode space serve as power outlet leads in the above-described embodiment, it is necessary to protect the entire side facing the cathode space against corrosion. Even the small rate of removal of material from stainless steel could have an adverse effect on operation at the desired operating lives of the electrochemical cell of more than ten years. When alkali metal and sulfur are used as anode material and cathode material, it has been found that corrosion protection layers based on chromium are particularly stable. For this purpose, it is possible, for example, to encase the entire component made up of sheet-like structure having openings and outer wall with hard chromium. As an alternative, it is also possible to chromium plate the sides of the sheet-like structure having openings and of the outer wall facing the cathode space. Here, chromium carbide or ferrochrome layers which are likewise resistant to corrosion by alkali metal polysulfide, in particular sodium polysulfide, are formed.

According to the invention, each segment is filled with a porous felt or with a material being different from a porous felt. The porous felt or the material being different from the porous felt ensures that the cathode material and the reaction product of cathode material and anode material which is formed in the cathode space remain in a uniform mixture. Furthermore, the porous felt or the material being different from the porous felt serves to bring about uniform transport of cathode material and reaction product away from the electrode and to the electrode. For this purpose, the porous felt or the porous material being different from the porous felt is made of a material which is readily wettable by the cathode material and the reaction product of cathode material and anode material. To obtain good wetting of the porous felt or the material being different from the porous felt even in the case of different wetting properties of cathode material and reaction product, it is advantageous to make the porous felt or the porous material being different from the porous felt of different materials, with one part of the material being readily wettable by the cathode material and one part being readily wettable by the anode material. When a mixture of a plurality of different materials is used for the porous felt or the material being different from the porous felt, these are preferably used in equal proportions by volume. However, depending on the design of the electrochemical cell, other volume ratios can also be set. When an alkali metal is used as anode material and sulfur is used as cathode material, thermally stabilized polymer fibers, fibers of oxide ceramics or glass fibers, preferably thermally stabilized polymer fibers in mixture with fibers of oxide ceramics or glass fibers, are also particularly suitable as material of which the porous felt or the porous material being different from porous felt is made up. Suitable fibers of oxide ceramics or glass fibers are, in particular, fibers of aluminum oxide ($Al_2O_3$), silicon dioxide, for example glass fibers, mixed oxides of aluminum with silicon, silicates or aluminosilicates, zirconium oxide or mixtures of these materials. Suitable thermally stabilized polymer fibers are, for example, oxidized, thermally stabilized polyacrylonitrile (PAN) fibers, which are, for example, commercially available under the name PANOX®.

The porous material being different from porous felt can be for example a woven fabric, a knitted fabric, a knotted fabric, a network, a non-woven, an open-cell foam, or a three-dimensional netting.

When the segments are filled with a felt, an improvement in mass transfer in the felt in the segments can be achieved by a preferential direction being imparted to the felt by needling. The preferential direction preferably runs perpendicular to the sheet-like structure having openings. Furthermore, an improvement in the mass transfer can be achieved by means of channel-like structures in the porous felt or the porous material being different from the porous felt, preferably perpendicular to the sheet-like structure having openings, independent from the used porous material.

To obtain a sufficiently large capacity of the apparatus for storing electric energy, it is necessary to provide a sufficiently large quantity of cathode material and anode material in the charged state. The cathode material can be stored in the cathode space, with the cathode space being configured so that the entire cathode material can be accommodated therein. Furthermore, there has to be sufficient space available in order to be able to accommodate the volume increase during discharging caused by reaction of the cathode material with the anode material.

Particularly in the case of apparatuses for storing electric energy which operate using an alkali metal, in particular sodium, as anode material and sulfur as cathode material, it is advantageous for reasons of operational safety for only a small amount of anode material to be comprised in the anode space of the electrochemical cell. In order to achieve a large capacity, it is therefore necessary to provide a container for anode material which is separate from the electrochemical cell and is connected to the anode space. The separate container for anode material ensures that, for example in the case of damage to the solid electrolyte, only a small amount of anode material which can react in an uncontrolled manner is available. During operation of the apparatus for storing electric energy, in particular in the case of output of electric energy in the form of electric current, additional anode material is continuously fed from the container for anode material into the anode space. The transport is preferably pressure-driven as a result of the transport of ions of the anode material through the solid electrolyte and reaction of the anode material with the cathode material lowering the pressure in the anode space as a result of anode material leaving the anode space and further anode material thus being fed from the container for anode material into the anode space by the resulting pressure difference.

In a particularly preferred embodiment, the container for anode material is positioned beneath the electrochemical cell and connected via a riser tube to the anode space. The positioning of the container for anode material beneath the electrochemical cell makes it possible to prevent anode material being fed in an uncontrolled manner into the anode space in the event of a malfunction. Transport is effected purely pressure-driven through the riser tube. For this purpose, it is necessary for the upper end of the riser tube which opens into the anode space always to dip into the anode material in the anode space, especially during discharging of the apparatus for storing electric energy.

To be able to assemble the container for the anode material and the electrochemical cell in a simple manner and to obtain precise positioning of the container for the anode material, preference is given to a centering rod being arranged beneath the electrochemical cell and the container for anode material being located on the centering rod. A potential separation of container for anode material and electrochemical cell by means of the centering rod is obtained by the centering rod being enclosed by insulation or being made of an electrically nonconductive material. In order to locate the container on the centering rod, the former preferably has an annular structure, with a space whose internal diameter corresponds to the external diameter of the centering rod with any insulation arranged thereon being formed in the interior of the container for anode material.

The precise positioning of the container for anode material relative to the electrochemical cell allows simple assembly of a plurality of apparatuses for storing electric energy to give a module by these being positioned simply next to one another.

As an alternative to the embodiment in which one container for anode material is assigned to one electrochemical cell, it is also possible to provide a container for a plurality of electrochemical cells or even only a single container for anode material which is connected to all electrochemical cells of a module. However, preference is given to providing a separate container for each individual electrochemical cell. This has, for example, the advantage that in the event of replacement of an individual cell being necessary, it is not necessary to undertake a complicated separation of the electrochemical cell from the container for anode material but instead the electrochemical cell can be switched off as a whole and replaced.

A suitable material for the container for anode material is likewise preferably a steel, in particular stainless steel and very particularly preferably a stainless steel having the material number 1.4404 or 1.4571.

Any necessary potential separation of container for anode material and electrochemical cell can be achieved by the electrochemical cell being provided with a bottom plate composed of an electrically insulating material. The container for anode material is then, when positioned beneath the electrochemical cell, arranged with its upper side in contact with the bottom plate composed of electrically insulating material.

To achieve a further minimization of the amount of anode material in the anode space, preference is also given to a displacement body being accommodated in the anode space. The displacement body is in this case preferably configured so that it is not in contact with the solid electrolyte and a gap is formed between solid electrolyte and displacement body, with the gap being filled with anode material. The use of the displacement body preferably limits the volume of anode material in the interior of the solid electrolyte to less than 20%, in particular to less than 10%, of the total interior volume of the solid electrolyte.

A further task to be performed by the displacement body is to conduct away the electric current on the anode side. When an alkali metal is used as anode material, the anode material acts as electrode. However, the electrical conductivity of the alkali metal, in particular sodium, is not sufficiently high over the length of the solid-state electrolyte to assume the function of conducting away the electric current because of the thin gap between displacement body and solid electrolyte. For this reason, the displacement body is preferably made of a material which is inert relative to the anode material and has good electrical conductivity, in particular aluminum or an aluminum-comprising alloy.

Since the anode space is usually located in the interior of the solid electrolyte, the displacement body is preferably configured so that its outer contour corresponds to the inner contour of the solid electrolyte, so that only a small gap remains between displacement body and solid electrolyte when the displacement body is installed. The displacement body therefore usually has the shape of a tube closed at one end. A tube of this type which is composed of aluminum or an aluminum-comprising alloy and is closed at one end is usually produced by flow molding or extrusion. In the case of flow molding, pressure is exerted by means of a punch on an aluminum slug which has been laid in a mold which forms the outer contour of the displacement body. Under applied pressure, the aluminum softens and begins to flow in the gap between external mold and punch. The head of the displacement body, which serves not only to conduct away the electric power but, in the case of a container for the anode material positioned beneath the electrochemical cell, preferably also serves for connection of the riser tube, can likewise be produced by the flow molding process. It is also possible, for example, to introduce an insert composed of stainless steel with tube ports in such a way that aluminum flows around it during the flow molding operation and is thus integrated into the future component geometry. In this way, an aluminum-stainless steel transition which allows simple welding-on of the riser conduit can be produced in a simple manner. To effect sealing, it can be necessary to introduce additional sealing elements during the flow molding process.

The displacement body can, for example, be welded to the displacement head. The flow molding process makes it possible to manufacture displacement bodies advantageously and with short cycle times. Furthermore, it is possible to achieve a sufficiently good surface quality for the displacement body to require no further machining. To prevent a reaction of the aluminum with the cathode material or the reaction product formed from anode material and cathode material in the event of fracture of the solid electrolyte, preference is given to additionally installing a stainless steel foil in the gap between displacement body and solid electrolyte. As an alternative, it is also possible to provide the displacement body with a stainless steel coating. In order to stabilize the displacement body mechanically, it is possible to fill the hollow space in the interior with a material which is inert toward the anode material, cathode material and reaction product of anode material and cathode material. A suitable inert material is, for example, sand.

The invention further provides a method for the assembly and start-up of the apparatus for storing electric energy, which comprises the following steps:
  (a) mounting of the outer wall of the segments of the cathode space on the sheet-like structure having openings,
  (b) impregnation of the porous felt or the porous material being different from the porous felt and the porous electrode with alkali metal polysulfide,
  (c) introduction of porous felt impregnated with alkali metal polysulfide or of porous material being different from porous felt impregnated with alkali metal polysulfide into each segment and insertion of the porous electrode impregnated with alkali metal polysulfide,
  (d) positioning of the solid electrolyte within the sheet-like structure having openings so that the electrode is positioned between sheet-like structure having openings and solid electrolyte and connection of the components to form an electrochemical cell,
  (e) connection of the electrochemical cell with the container for anode material,
  (f) heating of the electrochemical cell to operating temperature,
  (g) application of an electric voltage in order to charge the apparatus, with the alkali metal polysulfide being dissociated into alkali metal and sulfur, the alkali metal going over into the anode space and being conducted into the container for alkali metal and the sulfur remaining in the cathode space.

To produce the electrochemical cell, the solid electrolyte is firstly introduced together with the necessary sealing elements into the lid of a cell container. Furthermore, the displacement body is likewise inserted together with the necessary sealing rings into the solid electrolyte. To connect solid electrolyte and displacement body, it is possible, for example, to provide a flange at the upper end via which the solid electrolyte and the displacement body can be bolted together. As an alternative, known processes such as thermocompression bonding (TCB) or reactive soldering (brazing) can be used for connecting solid electrolyte and cell container or displacement body. For this purpose, the solid electrolyte preferably has a head composed of a ceramic which does not conduct ions, for example alpha-aluminum oxide.

To produce a cell container, the outer walls of the individual segments of the cathode space are fastened in an electrically conductive and fluid-tight manner to the sheet-like structure having openings. Fluid-tight fastening is achieved, in particular, by the outer walls of the individual segments being welded to the sheet-like structure having openings. Finally, the bottom is attached to the cell container. When a chromium-based corrosion layer is to be applied, this is particularly preferably carried out after assembly of the cell container. Finally, when the container for anode material is positioned beneath the electrochemical cell, the centering rod is fastened to the bottom of the cell container.

Next, the porous felts which are to be placed in the segments of the cathode space or the porous material being different from porous felt which is to be placed in the segments of the cathode space are impregnated with alkali metal polysulfide, in particular sodium polysulfide, and cooled. The porous felts impregnated with alkali metal polysulfide or the porous material being different from porous felt impregnated with alkali metal polysulfide are then placed in the segments of the cathode space so that each segment is filled with a porous felt or with the porous material being different from porous felt. In order for the porous felts or the porous material being different from porous felt to be able to be introduced into the segments, it is advantageous for these to be compressed after impregnation or during impregnation and before insertion, so that they have a somewhat smaller cross section than the segments and the porous felts or the porous material being different from porous felt can be inserted without remaining hanging. For this purpose, the porous felts or the porous material being different from porous felt are, for example, compressed to such an extent that the cross section of the porous felt or the porous material being different from the porous felt after cooling of the alkali metal polysulfide corresponds in shape to the cross section of the segment into which it is to be introduced but the cross-sectional area is smaller, so that a gap of, for example, from 0.2 to 2 mm is formed between the wall of the segment and the porous felt or the porous material being different from the porous felt.

The porous electrode which has likewise been impregnated with alkali metal polysulfide, in particular sodium polysulfide, is placed in the interior of the sheet-like structure having openings in such a way that the assembly of solid electrolyte and displacement body can subsequently be inserted. When a chemical barrier layer is additionally provided, this is likewise impregnated with alkali metal polysulfide and positioned in the interior on the electrode on the side facing away from the sheet-like structure having openings. However, the porous electrode and the chemical barrier layer are in this case preferably adjoined to one another before insertion, impregnated jointly with alkali metal polysulfide and then inserted in such a way that the chemical barrier layer faces away from the sheet-like structure having openings and, after installation of the solid electrolyte, is in contact with the solid electrolyte.

As an alternative, it is of course also possible to place the porous electrode and optionally the chemical barrier layer after impregnation around the solid electrolyte and insert them together with the solid electrolyte into the space enclosed by the sheet-like structure having openings.

As in the case of the porous felts introduced into the segments or the porous material being different from the porous felt introduced into the segments, it is also advantageous here to compress the porous electrode and optionally the chemical barrier layer after impregnation or during impregnation with the alkali metal polysulfide in order to be able to insert these more easily. Furthermore, sufficient ionic contact with the ceramic solid electrolyte and sufficient electrical contact with the sheet-like structure having openings is in this way established after remelting as a result of recovery of the porous felt or the porous material being different from porous felt.

The electrochemical cell which has been produced in this way is then closed by means of a lid. In order to prevent anode material or cathode material getting out or going over through a leak from the anode space into the cathode space or from the cathode space into the anode space, appropriate sealing elements are inserted and the individual components are joined to one another, for example by means of bolts. The lid of the electrochemical cell is preferably welded on in order to obtain a hermetic seal. To compensate for tolerances of the assembly of solid electrolyte and displacement body and also the cell housing, the welding-on of the lid can be effected using additional material.

Finally, the container for anode material is connected by means of appropriate conduits to the electrochemical cell. When the container for anode material is positioned beneath the electrochemical cell, the centering rod is inserted into a corresponding opening in the container for anode material. The container for anode material can then be connected to the electrochemical cell. The riser tube for transport of the anode material is preferably installed on the container for anode material before the container for anode material is connected to the electrochemical cell and, after positioning of the container, merely has to be connected by means of a suitable connection at the top of the electrochemical cell. To obtain a secure connection, the riser tube is preferably welded to the connection at the top of the electrochemical cell.

For safety reasons, the electrochemical cell is preferably operated in such a way that the pressure in the cathode space is higher than the pressure in the anode space and in the container for anode material. In order to be able to set the pressure, a further conduit is preferably installed on the container for anode material. The pressure in the container for anode material and in the anode space can then be set via this conduit. After setting of the pressure, the conduit is closed, for example blanked off by welding. As an alternative, it is of course also possible to set the pressure not via the anode space and the container for anode material but instead in the cathode space.

After assembly of the apparatus for storing electric energy, it is heated to operating temperature. As a result, the alkali metal polysulfide with which the porous felt or the porous material being different from porous felt in the segments of the cathode space and the porous electrode are impregnated melts. An electric current is subsequently supplied to the electrochemical cell in order to charge the cell. As a result of the supply of electric current, the alkali metal polysulfide is dissociated into alkali metal and sulfur. The alkali metal ions formed pass through the solid electrolyte and are neutralized by uptake of electrons at the electrode in the anode space. The molten alkali metal formed in this way collects in the anode space. As soon as the latter is completely filled, the alkali metal formed flows through the connecting conduit, in particular the riser conduit, into the container for anode material and is stored there. The sulfur formed remains in the cathode space. After charging is complete, the apparatus for storing electric energy can be utilized for the first time as battery for supplying electric current.

The impregnation of the porous felt or the porous material being different from porous felt and the porous electrode with alkali metal polysulfide makes very much safer, compared to the prior art, filling of the electrochemical cell possible since no highly reactive alkali metal has to be handled.

To be able to operate the apparatus for storing electric energy safely not only during start-up but also later on, the apparatus is operated in such a way that the pressure in the cathode space is always higher than the pressure in the anode space regardless of the operating state. The pressure difference between anode space and cathode space depends, for example, on the pressure preset in the anode space and the free volume which remains in the anode space and in the cathode space. The pressure difference is dependent on the state of charge of the cell and is preferably in the range from 0.1 to 5 bar, in particular from 1 to 3 bar. The lower pressure in the anode space ensures that in the event of damage to the solid electrolyte, no anode material can enter the cathode space and lead to an uncontrolled reaction.

Examples of the invention are shown in the figures and are explained in more detail in the following description.

Figure 1:
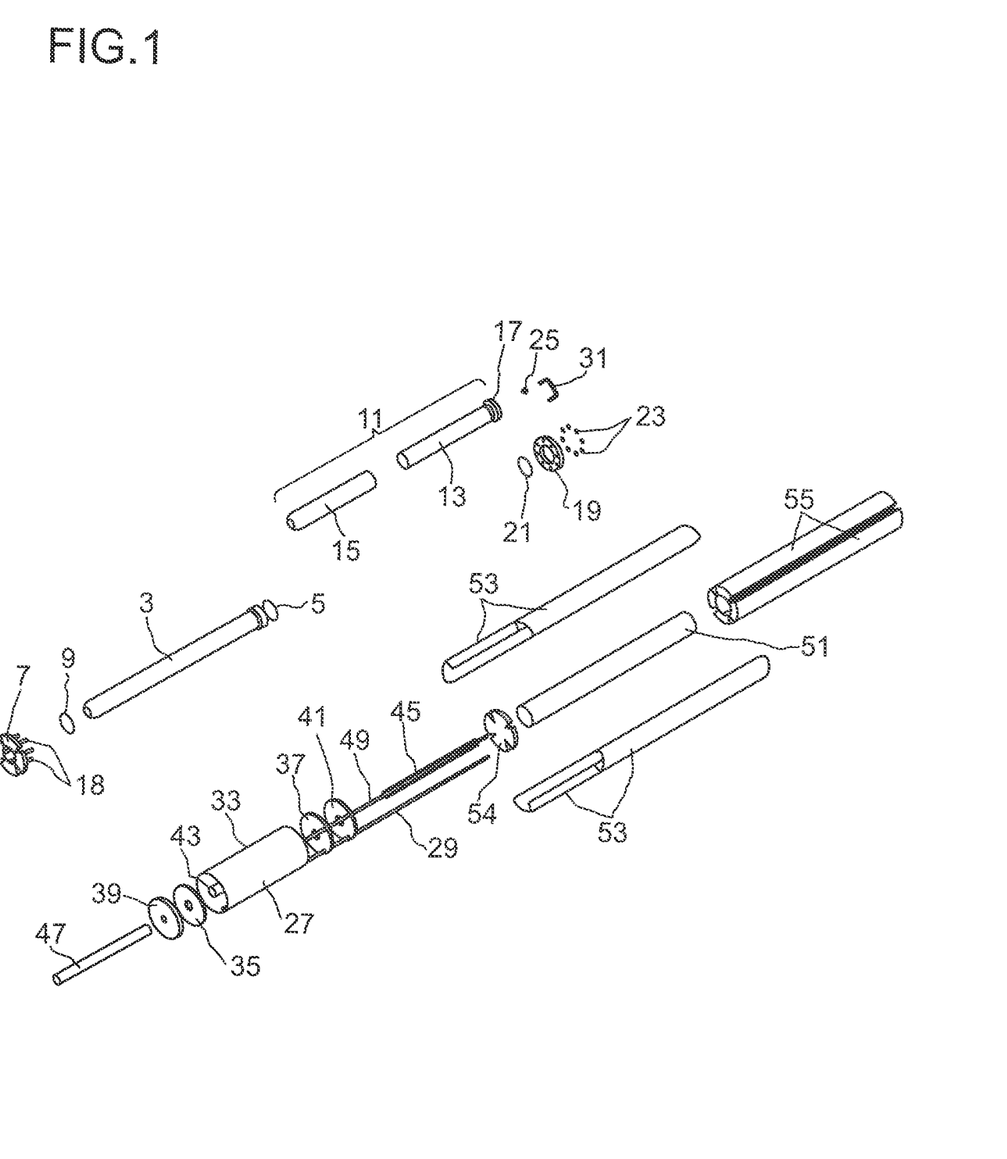
FIG. 1 an exploded view of an apparatus according to the invention for storing electric energy, FIG. 2 a longitudinal section through an apparatus according to the invention, FIG. 3 a longitudinal section through a displacement body, FIGS. 4 to 6 sectional views of a cathode space having one segment, FIGS. 7 and 8 sectional views of a cathode space having three segments, FIGS. 9 to 11 sectional views of a cathode space having four segments, FIG. 12 a sectional view of a cathode space having six segments.

The figures show:

FIG. 1 depicts an exploded view of an apparatus according to the invention for storing electric energy. From this, it is possible to see the components which are required for assembly of an apparatus for storing electric energy.

An apparatus for storing electric energy comprises a solid electrolyte 3 which conducts ions. A ceramic is usually used as material for the solid electrolyte 3. In the case of an alkali metal, in particular sodium, as anode material and sulfur as cathode material, preference is given to using β-aluminum oxide or β"-aluminum oxide which is optionally stabilized with magnesium oxide, lithium oxide or zirconium oxide. The solid electrolyte 3 is configured as a tube closed at the lower end in the embodiment depicted here. After assembly, the anode space of the electrochemical cell is located in the interior of the solid electrolyte 3. In order to seal the anode space of the electrochemical cell, a first sealing ring 5, which is mounted at the top of the solid electrolyte 3, is provided. The solid electrolyte 3 is pushed into a lid 7 for the cell container with a second sealing ring 9. The first sealing ring 5 and the second sealing ring 9 are preferably made of graphite in this case. This is stable toward the materials used in the electrochemical cell and resistant to the temperatures required during operation.

To decrease the volume of the anode space, a displacement body 11 is introduced into the solid electrolyte 3. The outer contour of the displacement body 11 has such a shape that, after installation of the displacement body, merely a gap remains between the interior wall of the solid electrolyte 3 and the outer contour of the displacement body 11. In the embodiment depicted here, the displacement body 11 is made up of two parts and comprises an upper part 13 with the displacement head 17 and a lower part 15. The upper part 13 and the lower part 15 of the displacement body are joined to form a single component, for example by welding.

To install the displacement body 11 in the solid electrolyte 3, a flange 19 is used in the embodiment depicted here. The flange 19 is placed together with a third sealing ring 21, preferably likewise composed of graphite, on the displacement head 17 and attached to the lid 7 of the cell container using fastening means 23, for example nuts. For this purpose, threads 18 are preferably installed on the lid 7 and are conducted through openings in the flange 19 and fastened by means of the nuts used as fastening means 23.

To be able to attach the transport conduit for the anode material to the displacement head 17, a connection element 25 is preferably inserted into the displacement head 17. The connection element 25 is preferably composed of stainless steel in order to ensure good weldability to the transport conduit for the anode material. When a container 27 for anode material is positioned beneath the electrochemical cell and transport of the anode material is effected through a riser tube 29, a connecting tube 31, for example, which is fastened at one end to the connection element 25 and at the other end to the riser tube 29 is utilized.

The container for anode material 27 comprises a container wall 33, a lower lid 35 and an upper lid 37 to close the container and also an insulating bottom plate 39 and an insulating cover plate 41.

To be able to connect the container for anode material flush with the electrochemical cell, the container is preferably, as shown here, ring-shaped with a central hollow space 43 for a centering rod 45. For potential separation, the centering rod 45 is preferably enveloped in insulation 47.

Furthermore, a pressure conduit 49 is provided in order to set the pressure in the anode space and the container 27 for anode material. After assembly, the pressure in the anode space and the container for anode material 27 is preferably set via the pressure conduit 49. The pressure conduit 49 is subsequently closed.

The electrochemical cell further comprises a cell container which is made up of a sheet-like structure 51 having openings. The sheet-like structure 51 having openings is made of an electrically conductive material which is chemically inert toward the materials used in the electrochemical cell, preferably stainless steel. The sheet-like structure 51 having openings is configured so that it completely covers the solid electrolyte 3 on the side of the cathode space. In the case of ring-shaped solid electrolytes 3 as shown in the embodiment depicted here, the sheet-like structure 51 also has a ring shape in the form of a tube. A porous electrode is located in the interior of the tubular sheet-like structure 51 having openings; this porous electrode preferably additionally has a chemical barrier layer on the side which is opposite the sheet-like structure 51 and in the assembled state faces the solid electrolyte 3.

To form the cathode space, outer walls 53 are mounted on the sheet-like structure 51 having openings, for example by welding. In the embodiment depicted here, four outer walls 53, which after assembly form a cathode space having four segments, are provided. Finally, a porous felt 55 which has preferably been impregnated with alkali metal polysulfide for assembly is placed in each of the segments. At the lower end, the segments of the cathode space are closed by a bottom plate 54.

Figure 2:
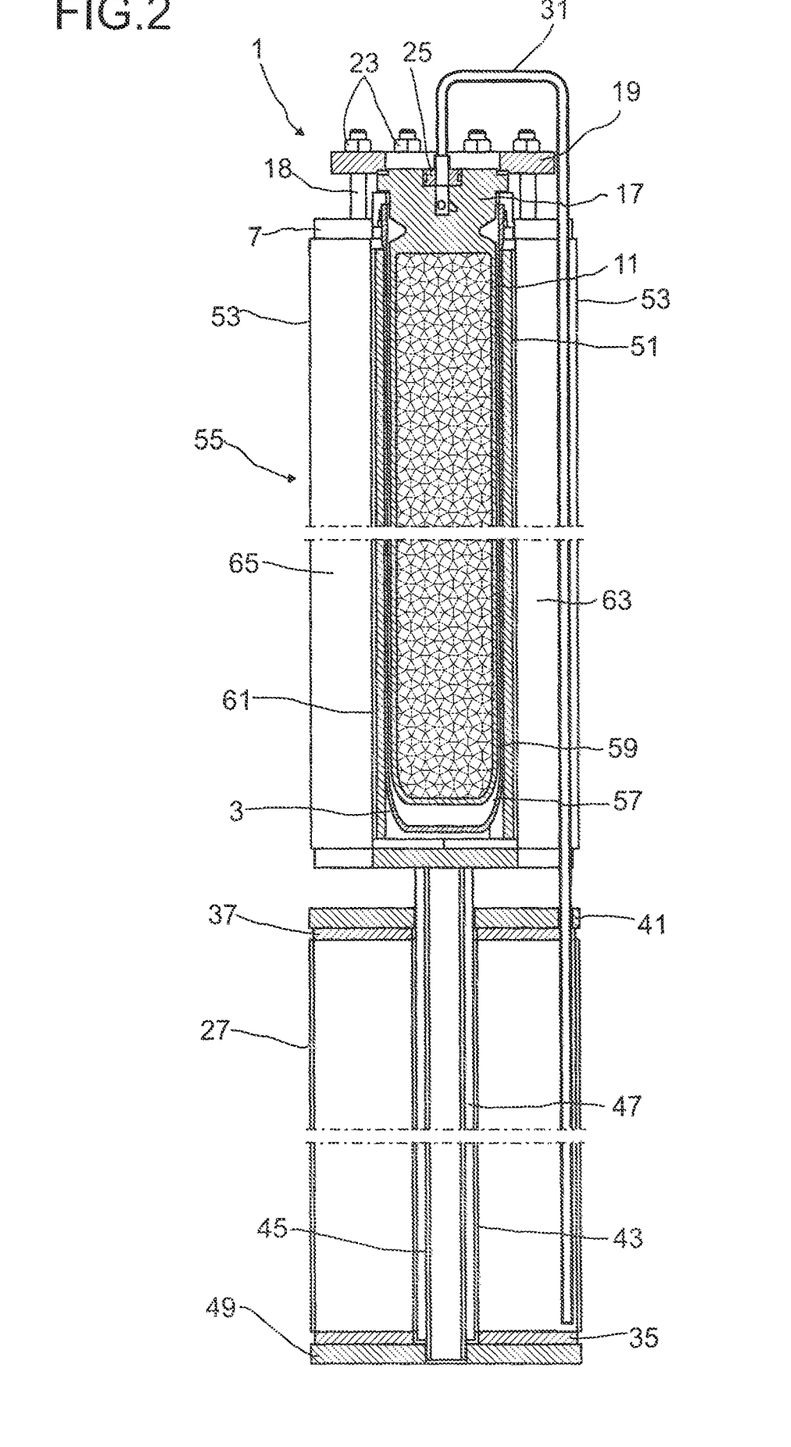

An assembled apparatus for storing electric energy is shown in a sectional view in FIG. 2.

In a preferred embodiment, the container 27 for anode material is located beneath the electrochemical cell 56 of an apparatus 1 for storing electric energy. For precise positioning, the container 27 has an annular shape with a hollow space 43 for accommodating the centering rod 45. In the fully assembled apparatus 1, the container 27 for anode material encloses the centering rod 45 enveloped in insulation 47. The container 27 for anode material is closed by means of a lower lid 35 and an insulating bottom plate 39 and also an upper lid 37 and an insulating cover plate 41.

The container 27 for anode material is connected to the electrochemical cell 56 by the riser tube 29. When the electrochemical cell 56 is discharged, anode material, in particular liquid sodium, flows from the container 27 for anode material through the riser tube 29 into an anode space 57 of the electrochemical cell 56. For this purpose, a connection for the riser conduit 39 which is connected to the connecting tube 31 is provided on the displacement head 17. The connection is effected via the connection element 25. The anode material can then flow through the displacement head 17 into the anode space 57. The anode space 57 is located in the interior of the solid electrolyte 3 and its volume is reduced by the displacement body 11 inserted into the solid electrolyte 3. A gap 59 which is filled with anode material is formed between the displacement body 11 and the solid electrolyte 3.

The solid electrolyte 3 is enclosed by the porous electrode 61 which is optionally provided with a chemical barrier layer. If a chemical barrier layer is present, this is on the side facing the solid electrolyte 3.

The sheet-like structure 51 having openings adjoins the porous electrode 61. The outer walls 53 are installed on the sheet-like structure 51 having openings. The outer walls 53 each enclose individual segments 63, with all the segments 63 together forming the cathode space 65 of the electrochemical cell 56. The outer walls 53 bounding the segments 63 close off the electrochemical cell 56 from the outside and form the cell container. The porous felt 55 is present in the interior of each segment 63.

For production engineering reasons, the displacement body is preferably configured as a hollow body. To prevent the walls from being deformed, for example during charging and discharging operation, it is possible to fill the hollow space with an inert material in order to stabilize this mechanically. For this purpose, the hollow space can be filled with an inert material, for example sand.

Figure 3:
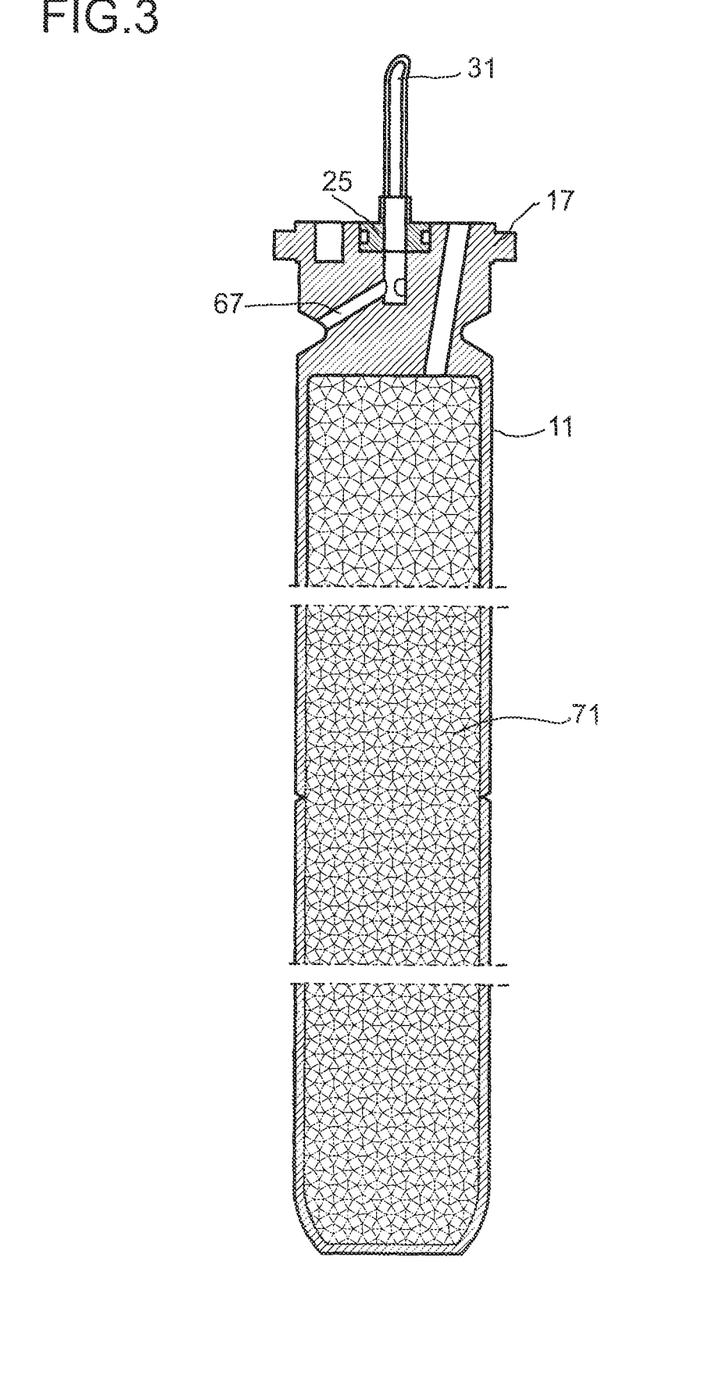

FIG. 3 shows a sectional view of a displacement body.

For the anode material to be able to flow from the container for anode material into the anode space, the displacement head is provided with a channel 67 which is connected at one end via the connection element 25 to the connecting tube 31 and at the other end opens into the anode space. For this purpose, a groove 69 can be, as shown here, provided on the displacement head 17, in which groove the cross-sectional area of the anode space is increased compared to the gap between solid electrolyte and displacement body 11. Here too, a hollow space 71 is formed in the interior of the displacement body 11 and is filled with an inert material.

Figure 4:
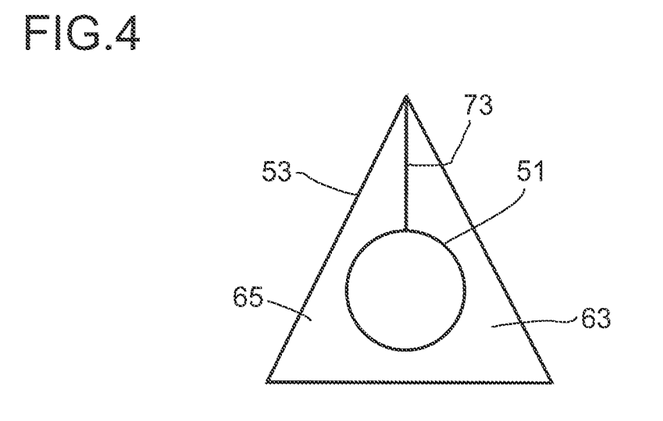
Figure 5:
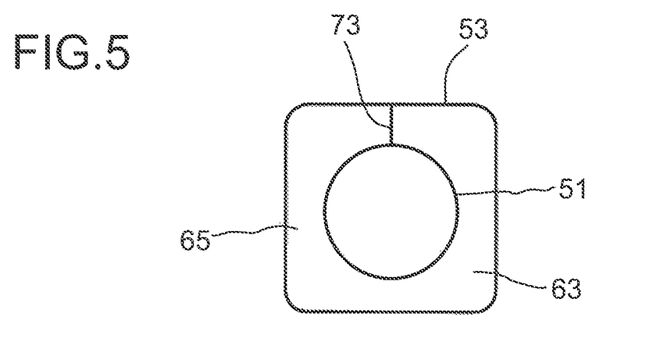
Figure 6:
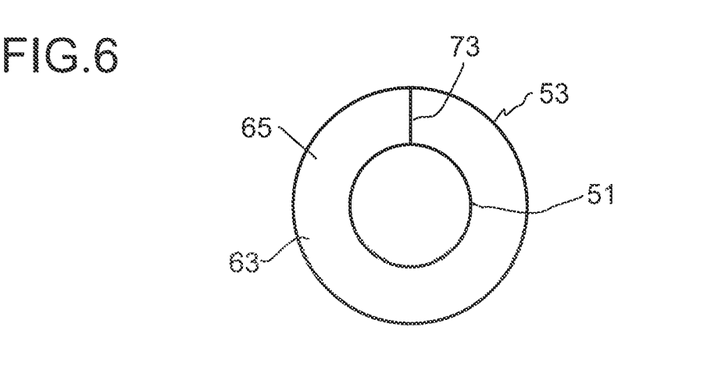

FIGS. 4 to 6 depict embodiments of a cathode space having only one segment.

The cathode space 65 comprises the sheet-like structure 51 having openings and the outer wall 53 which closes off the cathode space 65 on the outside. The cathode material, for example sulfur, is present in the cathode space in the charged state, and the reaction product of cathode material and anode material, for example alkali metal polysulfide, in particular sodium polysulfide, is present in the discharged state. To equalize flow and to prevent cathode material and reaction product from demixing, the cathode space is preferably filled with a porous felt.

In the apparatus of the invention for storing electric energy, the sheet-like structure 51 and the outer wall 53 serve as power outlet leads for the porous electrode 61 which is not shown here. For both sheet-like structure 51 and outer wall 53 to be able to act as power outlet leads, it is necessary for these to be electrically conductively connected to one another. For this purpose, for example in the case of a cathode space 65 having only one segment 63, it is possible to utilize an outer wall element 73 by means of which the outer wall 53 is fastened to the sheet-like structure 51 having openings. Fastening is preferably effected by welding.

The cross-sectional shape of the cell can be chosen freely. Thus, it is possible, for example, to have a triangular cross section, as shown in FIG. 4, by giving the outer wall 53 a triangular shape. Correspondingly, the outer wall 53 can be given a square cross section as in FIG. 5 or a circular cross section as in FIG. 6.

Apart from the shapes depicted here, any other shape is also conceivable for the outer wall. Instead of an outer wall element 73 by means of which the outer wall 53 is connected to the sheet-like structure 51 having openings, it is also possible to configure the outer wall with two side walls which are fastened next to one another to the sheet-like structure 51 having openings. The outer walls 53 of the embodiments shown in FIGS. 7 to 11, for example, are fastened in a corresponding way.

Figure 7:
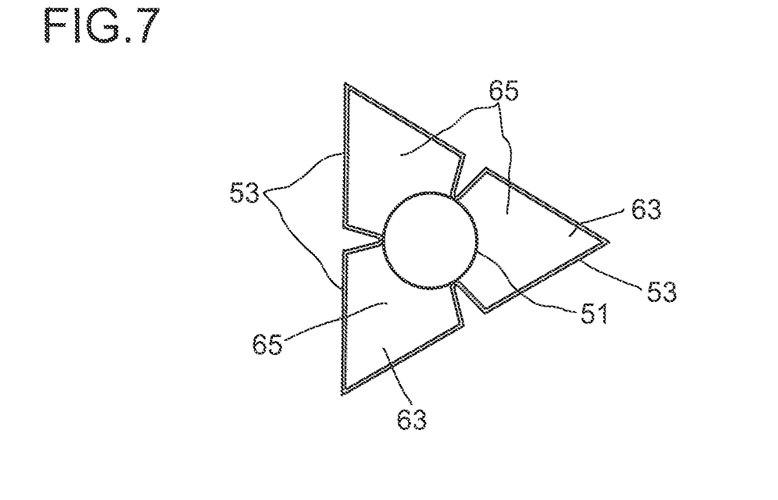
Figure 8:
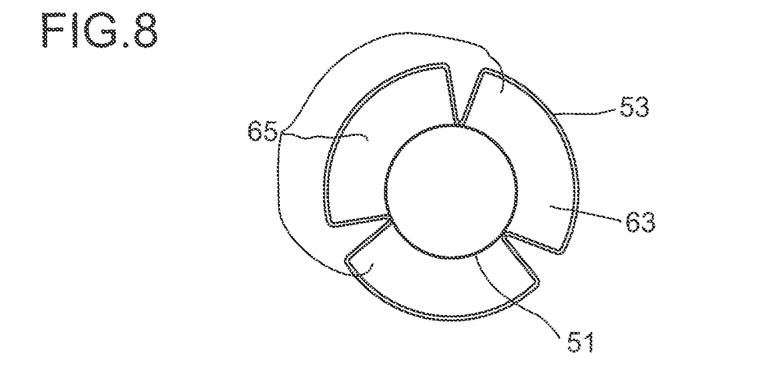

In FIGS. 7 and 8, the cathode space 65 in each case comprises three segments, with each segment having a separate outer wall 53 which is in each case joined on two sides to the sheet-like structure 51 and thus completely closes off the segment 63 from the outside.

As an alternative to the variants depicted here, in which the outer walls 53 of two adjacent segments 63 are in contact with the sheet-like structure 51 in the region of the connection, it is also possible to provide a greater spacing here. In this case, it is necessary for there to be no openings in the sheet-like structure 51 in the region between two segments 63 so that no cathode material can exit between the segments 63.

Figure 12:
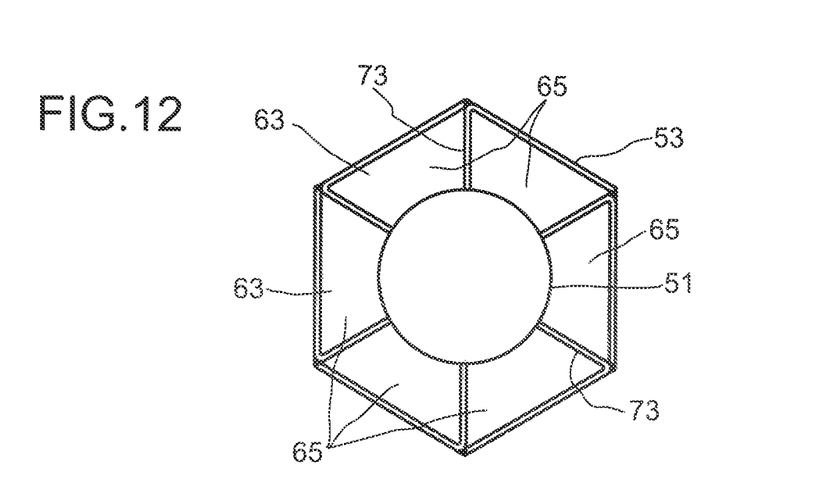

Furthermore, it is also possible to form a common outer wall instead of a separate outer wall 53 for each segment 63 and to separate the individual segment 63 by outer wall elements 73, as depicted in FIGS. 4 to 6 in the case of one segment 63 and in FIG. 12 for an embodiment having six segments 63.

In a configuration having three segments 63, too, the outer contour of the cathode space 65 can assume any shape. Thus, for example, a triangular cross section, as shown in FIG. 7, or a circular cross section, as shown in FIG. 8, is possible. Any other cross-sectional shape is also conceivable.

Figure 9:
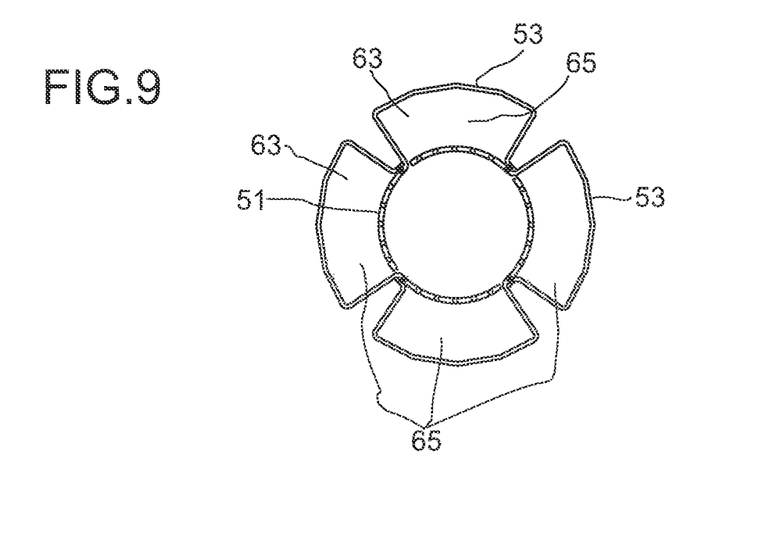
Figure 10:
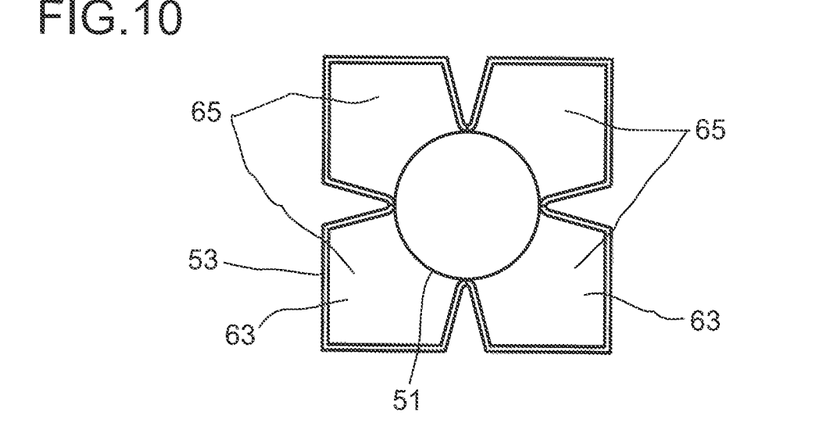
Figure 11:
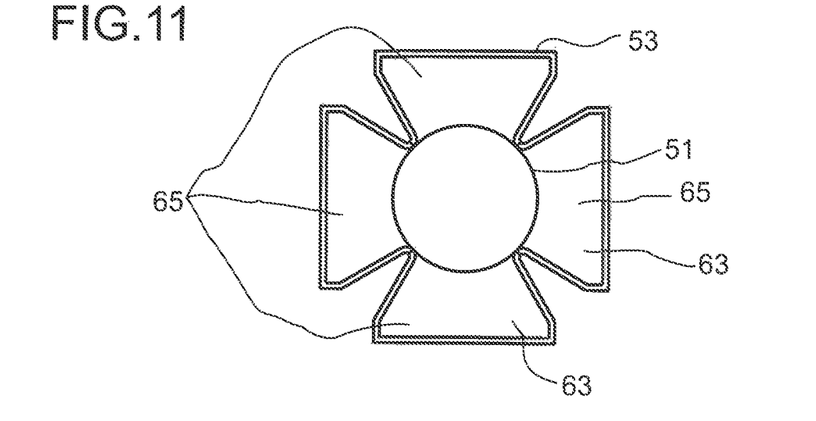

Different variants for a configuration having four segments 63 are shown in FIGS. 9 to 11. Here too, it is possible either to provide a spacing between two outer walls 53 enclosing the segments 63 or, as an alternative, to effect separation by means of an outer wall element 73, with the outer wall element 73 separating two segments 63 from one another.

As a particular embodiment, FIG. 9 shows outer walls which are made up of sheet metal strips having unperforated regions for the outer wall 53 and perforated regions for the sheet-like structure 51 having openings. The four segments 63 shown and also the sheet-like structure 51 having openings can thus be made of only four sheet metal strips. These are joined in a fluid-tight manner, for example by welded seams, at the indicated points. Such an embodiment, too, can be utilized for producing any further geometry of the outer wall 53 and of the sheet-like structure 51 having openings.

Furthermore, it is also possible in the case of an embodiment having four segments 63 to configure the cathode space 65 with any cross section. Thus, the cross section can, for example, be circular, as shown in FIG. 9, or essentially square, as shown in FIGS. 10 and 11. In the case of an essentially square cross section, the segments 63 can, for example, in each case extend from the middle of one side via the corner to the middle of the adjacent side, as shown in FIG. 10. As an alternative, it is also possible, as shown in FIG. 11, for the segments 63 to extend along one edge of the square.

An embodiment having six segments 63 is shown in FIG. 12. Here, the segments 63 are in each case separated from one another by an outer wall element 73. The walls on the outside of the individual segments 63 are straight, so that a hexagonal cross section is obtained. However, any other cross section would also be possible here. It is also possible to provide each of the segments 63 with a dedicated outer wall 53 as in the variants shown in FIGS. 7 to 11. To produce a cathode space 65 which has a plurality of segments 63 and in which the segments 63 are in each case separated by an outer wall element 73, it is possible, for example, to use outer wall parts which each comprise the outer wall element 73 and the wall on the outside and subsequently position these next to one another around the sheet-like structure 51 having openings. The individual outer wall parts are then joined to one another in a fluid-tight manner, for example by welding, and thus form the outer wall 53 of the electrochemical cell.

Apart from the embodiments depicted here, any further cross section and any other number of segments 63 are conceivable. However, preference is given here to the cross sections of all segments 63 of an electrochemical cell being identical. Furthermore, instead of the porous felt a porous material being different from porous felt can be introduced into the segments 63. Such a porous material being different from porous felt for example is a woven fabric, a knitted fabric, a knotted fabric, a network, a non-woven, an open-cell foam, or a three-dimensional netting.

LIST OF REFERENCE NUMERALS

1 Apparatus for storing electric energy
3 Solid electrolyte
5 First sealing ring
7 Lid
9 Second sealing ring
11 Displacement body
13 Upper part of the displacement body 11
15 Lower part of the displacement body 11
17 Displacement head
18 Thread 19 Flange
21 Third sealing ring
23 Fastening means
25 Connection element
27 Container for anode material
29 Riser tube
31 Connecting tube
33 Container wall
35 Lower lid
37 Upper lid
39 Insulating bottom plate
41 Insulating cover plate
43 Hollow space for accommodating a centering rod
45 Centering rod
47 Insulation
49 Pressure conduit
51 Sheet-like structure having openings
53 Outer wall
54 Bottom plate
55 Porous felt
56 Electrochemical cell
57 Anode space
59 Gap
61 Porous electrode
63 Segment
65 Cathode space
67 Channel
69 Groove
71 Hollow space
73 Outer wall element

The invention claimed is:

1. An apparatus for storing electric energy, which comprises an electrochemical cell having a cathode space for accommodating a liquid cathode material and an anode space for accommodating a liquid anode material, where the cathode space and the anode space are separated by a solid electrolyte, wherein the solid electrolyte is enclosed by a sheet-like structure having openings through which the cathode material can flow, the sheet-like structure is made of an electrically conductive material and the cathode space comprises at least one segment, where each segment has an outer wall composed of an electrically conductive material and the outer wall is fastened in a fluid-tight and electrically conductive manner to the sheet-like structure having openings, wherein each segment is filled with a porous felt or a porous material being different from porous felt and the cathode space is divided by the sheet-like structure having openings into an inner region and an outer region and a porous electrode and a chemical barrier layer composed of a material which does not conduct electrons are accommodated in the inner region between the sheet-like structure having openings and the solid electrolyte and the outer region comprises the at least one segment.

2. The apparatus according to claim 1, wherein the porous material being different from porous felt is a woven fabric, a knitted fabric, a knotted fabric, a network, a non-woven, an open-cell foam, or a three-dimensional netting.

3. The apparatus according to claim 1, wherein the porous felt or the porous material being different from porous felt is made up of oxidized thermally stabilized polymer fibers, fibers composed of oxide ceramic or glass fibers or of oxidized thermally stabilized polymer fibers in mixture with fibers of oxide ceramics or glass fibers.

4. The apparatus according to claim 1, wherein the material which does not conduct electrons is selected from among aluminum oxide, silicon dioxide, mixed oxides of aluminum with silicon, silicates and aluminosilicates.

5. The apparatus according to claim 1, further comprising a container for the anode material, where the container for the anode material is positioned beneath the electrochemical cell and connected via a riser tube to the anode space.

6. The apparatus according to claim 5, wherein a centering rod is arranged beneath the electrochemical cell and the container for the anode material is guided on the centering rod.

7. The apparatus according to claim 1, wherein a displacement body is accommodated in the anode space.

8. The apparatus according to claim 1, wherein the anode material is an alkali metal and the cathode material is sulfur.

9. A method for the assembly and start-up of an apparatus for storing electric energy according to claim 1, which comprises the following steps:
(a) mounting of the outer wall of the at least one segment of the cathode space on the sheet-like structure having openings,
(b) impregnation of the porous felt or the porous material being different from the porous felt and the porous electrode with alkali metal polysulfide,
(c) introduction of porous felt impregnated with alkali metal polysulfide or of porous material being different from porous felt impregnated with alkali metal polysulfide into each segment and insertion of the porous electrode impregnated with alkali metal polysulfide,
(d) positioning of the solid electrolyte within the sheet-like structure having openings so that the porous electrode is positioned between the sheet-like structure having openings and the solid electrolyte to form an electrochemical cell,
(e) connection of the electrochemical cell with the container for the anode material,
(f) heating of the electrochemical cell to an operating temperature,
(g) application of an electric voltage in order to charge the apparatus, with the alkali metal polysulfide being dissociated into alkali metal and sulfur, the alkali metal going over into the anode space and being conducted into the container for the anode material and the sulfur remaining in the cathode space.

10. The method according to claim 9, wherein the porous felt or the porous material being different from porous felt and/or the porous electrode are compressed after impregnation or during the impregnation in step (b).

11. The method according to claim 9, wherein the alkali metal is sodium.

12. The method according to claim 9, wherein the alkali metal is conducted via a riser tube into the container for the anode material positioned beneath the electrochemical cell.

13. The method according to claim 9, wherein a pressure in the cathode space is higher than a pressure in the anode space and in the container for the anode material.

14. A method for operation of an apparatus according to claim 1, wherein a pressure in the cathode space is higher than a pressure in the anode space regardless of an operating state.

15. The method according to claim 14, wherein a pressure difference between the anode space and the cathode space is in a range from 0.1 to 5 bar.

* * * * *